(12) United States Patent
Zhang et al.

(10) Patent No.: US 12,530,066 B2
(45) Date of Patent: Jan. 20, 2026

(54) MULTI-POWER FLOW INTEGRATED PARALLEL QUANTUM COMPUTING METHOD, SYSTEM, AND STORAGE MEDIUM OF POWER SYSTEM

(71) Applicant: Hefei University of Technology, Hefei (CN)

(72) Inventors: Dabo Zhang, Hefei (CN); Zhen Xu, Hefei (CN); Hejun Yang, Hefei (CN); Yinghao Ma, Hefei (CN)

(73) Assignee: Hefei University of Technology, Hefei (CN)

( * ) Notice: Subject to any disclaimer, the term of this patent is extended or adjusted under 35 U.S.C. 154(b) by 0 days.

(21) Appl. No.: 19/050,151

(22) Filed: Feb. 11, 2025

(65) Prior Publication Data

US 2025/0306657 A1 Oct. 2, 2025

(30) Foreign Application Priority Data

Apr. 2, 2024 (CN) .......................... 202410389684.2

(51) Int. Cl.
*G06F 1/26* (2006.01)
*G06N 10/60* (2022.01)

(52) U.S. Cl.
CPC .............. *G06F 1/26* (2013.01); *G06N 10/60* (2022.01)

(58) Field of Classification Search
CPC .................................. G06F 1/26; G06N 10/60
See application file for complete search history.

(56) References Cited

U.S. PATENT DOCUMENTS

2018/0096085 A1* 4/2018 Rubin .................... G16C 10/00
2019/0266213 A1* 8/2019 Hastings ................ G06F 17/17

FOREIGN PATENT DOCUMENTS

CN 113222383 A 8/2021
CN 117374985 A * 1/2024 ............. G06N 10/60

* cited by examiner

Primary Examiner — Michael D. Yaary
(74) Attorney, Agent, or Firm — Addison D. Ault; IPGentleman Intellectual Property Services, LLC

(57) ABSTRACT

A multi-power flow integrated parallel quantum computing method, a system, and a storage medium of a power system relate to the field of power flow calculation and quantum computing technology of power systems. In the multi-power flow integrated parallel quantum computing method, the quantum power flow equations to be solved are classified and integrated, and the quantum calculation of multiple quantum power flow equations to be solved is converted into the quantum calculation of a quantum integrated power flow equation to be solved, which makes full use of the superposition characteristics of quantum calculation. It can significantly reduce the number of quantum hardware used in quantum power flow calculation, and is consistent with the existing quantum power flow algorithm in terms of calculation results and iteration times.

20 Claims, 2 Drawing Sheets

MULTI-POWER FLOW INTEGRATED PARALLEL QUANTUM COMPUTING METHOD, SYSTEM, AND STORAGE MEDIUM OF POWER SYSTEM

CROSS REFERENCE TO THE RELATED APPLICATIONS

This application is based upon and claims priority to Chinese Patent Application No. 202410389684.2, filed on Apr. 2, 2024, the entire contents of which are incorporated herein by reference.

TECHNICAL FIELD

The invention relates to the field of power flow calculation and quantum computing technology of power systems, particularly to a multi-power flow integrated parallel quantum computing method, a system, and a storage medium of a power system.

BACKGROUND

The quantum power flow algorithm based on the quantum algorithm provides a new possibility for real-time power flow calculation of a large-scale power system. Compared with the classical computer, any quantum bit in the quantum computer can be in the superposition state of 0 and 1, and the quantum gate operation applied to the superposition state can process all possible states at the same time, which calculates this part have the ability of parallel computing, so that the quantum power flow algorithm can use fewer computing units to complete the storage and calculation of tens of millions of power flow equations. The existence of entangled quantum states makes each quantum bit in the quantum system entangled with each other, the application of quantum gate operation on any quantum bit can affect the state of other quantum bits, which calculates this part has a faster information processing speed, and then the quantum power flow algorithm is expected to meet the real-time power flow calculation requirements of large-scale power systems.

The large-scale access of new energy makes the operation mode of the new power system complex and changeable, in order to ensure the safe and economic operation of the power system, the real-time power flow calculation needs to be performed repeatedly in the simulation model. However, the current quantum power flow algorithm can only be used to solve a single power flow equation. When the number of equations to be solved increases, the quantum circuit needs to be set repeatedly, and the total number of quantum hardware required for solving is large, which significantly reduces the computational efficiency of the quantum power flow algorithm. To meet the requirements of the power grid for real-time power flow calculation and calculation scale, it is necessary to propose a method that can process multiple power flow equations in parallel. By adding a small amount of quantum hardware, the parallel solution of multiple power flow equations can be completed by using the parallel characteristics of quantum computing.

SUMMARY

To overcome the defects that the existing quantum power flow algorithm in the above existing technology will lead to the waste of quantum hardware resources and low computational efficiency when solving multiple sets of power flow equations, this invention proposes a multi-power flow integrated parallel quantum computing method of a power system, which integrates multiple power flow equations for computing, and improves the use efficiency of quantum hardware and the computational efficiency of quantum power flow algorithm.

The invention proposes a multi-power flow integrated parallel quantum computing method of a power system, including the following steps:

S1, according to a topological network structure of a power system and an operation status of equipment in the power system, constructing a linear equation $Ax=b$ of a quantum power flow equation at $m_1$ time points; A is a known matrix, x is an unknown vector composed of a grid parameter to be solved, and b is a vector composed of a known grid parameter;

S2, for the linear equation $Ax=b$ of each quantum power flow equation, transforming the known matrix A into a Hermitian matrix A', and then transforming the equation $Ax=b$ into a quantum power flow equation $A'x'=b'$ to be solved;

S3, selecting a quantum algorithm to calculate a number of quantum bits required to solve the quantum power flow equation to be solved;

S4, combined with the number of quantum bits needed to solve, dividing all the quantum power flow equations to be solved into multiple sets of equations to be integrated; for a single set of equations to be integrated, constructing a quantum integrated power flow equation by combining all the quantum power flow equations to be solved in a set of equations to be integrated;

S5, constructing a quantum circuit to solve each quantum integrated power flow equation, and updating node voltage data of a power grid according to a calculation result of the quantum integrated power flow equation;

S6, determining whether the calculation result meets a set convergence condition; if not, then returning S1; if so, completing the current calculation.

Preferably, assuming a total number of linear equations $Ax=b$ of the quantum power flow equation constructed in S1 is M, a $m_1$-th equation is $A(m_1)x(m_1)=b(m_1)$, and a transformed quantum power flow equation to be solved is $A'(m_1)x'(m_1)=b'(m_1)$;

$$A'(m_1) = \begin{pmatrix} 0 & A(m_1) \\ A(m_1)^H & 0 \end{pmatrix}$$

$$x'(m_1) = [0, x(m_1)]^T$$

$$b'(m_1) = [b(m_1), 0]^T$$

$A(m_1)$ is a known matrix in the $m_1$-th equation, $x(m_1)$ is an unknown vector composed of grid parameters to be solved in the $m_1$-th equation, $b(m_1)$ is a vector composed of the known grid parameter in the $m_1$-th equation, $x'(m_1)$ is a corresponding vector of $x(m_1)$, $b'(m_1)$ is a corresponding vector of $b(m_1)$, $A'(m_1)$ is a Hermitian matrix transmitted by $A(m_1)$; superscript T denotes a transpose.

Preferably, dividing the quantum power flow equations to be solved into multiple sets of equations to be integrated in S4, including the following steps:

S41, calculating an upper limit of a storage range and a lower limit of the storage range corresponding to a number of quantum bits required to solve the quantum power flow equation to be solved; selecting the quantum power flow equation to be solved with a largest ratio of the upper limit of the storage range to the lower limit of the storage range as a benchmark equation; the lower limit of the storage range of the number of quantum bits required to solve the benchmark equation is denoted as $|\lambda|_{min}$, and the upper limit of the storage range of the number of quantum bits required to solve the benchmark equation is denoted as $|\lambda|_{max}$;

S42, constructing a set of equations to be integrated, and migrating the quantum power flow equation to be solved that satisfies screening conditions of $|\lambda(m_{t2})_k|_{max} \leq |\lambda|_{max}$ and $|\lambda(m_{t2})_k|_{min} \geq |\lambda|_{min}$ in the set of quantum power flow equations to be solved to the set of equations to be integrated; $|\lambda(m_{t2})_k|_{max}$ denotes a maximum value of an absolute value of an eigenvalue of a $m_{t2}$-th quantum power flow equation to be solved in the set of quantum power flow equations to be solved, and $|\lambda(m_{t2})_k|_{min}$ denotes a minimum value of the absolute value of the eigenvalue of the $m_{t2}$-th quantum power flow equation to be solved in the set of quantum power flow equations to be solved; $\lambda(m_{t2})_k$ denotes a k-th eigenvalue of the $m_{t2}$-th quantum power flow equation to be solved in the set of quantum power flow equations to be solved;

S43, determining whether the set of quantum power flow equations to be solved is cleared; if not, then returning S41; if so, constructing the quantum integrated power flow equation corresponding to the set of equations to be integrated.

Preferably, assuming $n_2(m_1)$ denote the number of quantum bits required to solve an $m_2$-th quantum power flow equation to be solved, calculating the upper limit of the storage range $|\lambda(m_1)_k|_{max,2}$ and the lower limit of the storage range $|\lambda(m_1)_k|_{min,2}$ corresponding to $n_2(m_1)$ as follows:

when $|\lambda(m_1)_k|_{max} \geq 1$: an integer part of $|\lambda(m_1)_k|_{max,2} = 2^0 + 2^1 + \ldots + 2^i + \ldots + 2^{n_2(m_1,q_2)}$, $2^i$ denotes an i-th power of 2, $0 \leq i \leq n_2(m_1,q_2)$;

when $|\lambda(m_1)_k|_{max} < 1$: the integer part of $|\lambda(m_1)_k|_{max,2} = 0$;

when $|\lambda(m_1)_k|_{min} < 1$ and $n_2(m_1,q_1) = 0$: a decimal part of $|\lambda(m_1)_k|_{min,2} = 1/[2^{n_2(m_1,q_3)}]$, the decimal part of $|\lambda(m_1)_k|_{max,2} = 1 - 1/[2^{n_2(m_1,q_3)}]$, the integer part of $|\lambda(m_1)_k|_{min,2} = 0$;

when $|\lambda(m_1)_k|_{min} < 1$ and $n_2(m_1,q_1) \neq 0$: the decimal part of $|\lambda(m_1)_k|_{min,2} = 1/[2^{[n_2(m_1, q_1)+n_2(m_1,q_3)]}]$, the decimal part of $|\lambda(m_1)_k|_{max,2} = 1 - 1/[2^{[n_2(m_1,q_1)+n_2(m_1,q_3)]}]$, the integer part of $|\lambda(m_1)_k|_{min,2} = 0$;

when $|\lambda(m_1)_k|_{min} > 1$ and $n_2(m_1,q_1) = 0$: the decimal part of $|\lambda(m_1)_k|_{max,2} = 0$, the decimal part of $|\lambda(m_1)_k|_{min,2} = 0$, the integer part of $|\lambda(m_1)_k|_{min,2} = 1$;

when $|\lambda(m_1)_k|_{min} > 1$ and $n_2(m_1,q_1) \neq 0$: the decimal part of $|\lambda(m_1)_k|_{min,2} = 1/[2^{[n_2(m_1, q_1)+n_2(m_1,q_3)]}]$, the decimal part of $|\lambda(m_1)_k|_{max,2} = 1 - 1/[2^{[n_2(m_1,q_1)+n_2(m_1,q_3)]}]$, the integer part of $|\lambda(m_1)_k|_{min,2} = 1$;

where $n_2(m_1,q_1)$ is the number of quantum bits used to store the decimal part of the eigenvalue of the quantum power flow equation to be solved, $n_2(m_1,q_2)$ and $n_2(m_1, q_3)$ are the numbers of quantum bits used to store the integer part of the eigenvalue of the quantum power flow equation to be solved.

Preferably, if $|\lambda(m_1)_k|_{max} > 1$, then $n_2(m_1,q_2)$ is a binary digit of the integer part of $|\lambda(m_1)_k|_{max}$; otherwise, $n_2(m_1,q_2) = 0$; if $|\lambda(m_1)_k|_{min} < 1$, and $2 > 2^r \cdot |\lambda(m_1)_k|_{min} > 1$, r is any positive integer, then $n_2(m_1,q_3) = r$; otherwise, $n_2(m_1,q_3) = 0$.

Preferably, in S4, the quantum power flow equation to be solved belongs to the set of equations to be integrated of $n_2(m_1)$ when the quantum power flow equation to be solved is the same as $n_2(m_1)$.

Preferably, in S5, when the quantum integrated power flow equation satisfies an input constraint of the quantum computer, selecting the quantum algorithm to solve the quantum integrated power flow equation; on the contrary, performing an expanding order for the quantum integrated power flow equation to meet the input constraint of the quantum computer, and then selecting the quantum algorithm to solve the quantum integrated power flow equation after expanding order; an order of magnitude of a vector in the equation does not change before and after expanding order of the quantum integrated power flow equation.

Preferably, in S1, a construction method of the linear equation of the quantum power flow equation adopts: quantum direct current power flow algorithm, quantum fast decoupling power flow algorithm, rectangular coordinate form quantum Newton-Raphson power flow algorithm, or polar coordinate form quantum Newton-Raphson power flow algorithm.

The invention proposes a multi-power flow integrated parallel quantum computing system, including a memory and a processor, a computer program is stored in the memory, the processor is connected to the memory, and the processor is used to execute the computer program to realize the multi-power flow integrated parallel quantum computing method of the power system.

The invention proposes a storage medium, the storage medium stores a computer program, when the computer program is executed, it is used to realize the multi-power flow integrated parallel quantum computing method of the power system.

The invention has the following advantages:

(1) A multi-power flow integrated parallel quantum computing method of the power system is proposed, by using the superposition characteristics of quantum computing, the number of quantum hardware used in quantum power flow calculation can be significantly reduced, and the calculation results and the number of iterations are consistent with the existing quantum power flow algorithm.

(2) The integrated matrix structure of the quantum power flow equation proposed by the invention can ensure that each equation does not affect each other in the process of quantum computing, and ensure the convergence performance of each quantum power flow equation.

(3) The expansion setting of the quantum power flow equation proposed by the invention will not destroy the invertibility of the matrix before expanding order. In addition, if the matrix before expanding order is really symmetric, the proposed setting of expanding order will not destroy its symmetry, which ensures the reliability of the calculation results.

DETAILED DESCRIPTION OF THE EMBODIMENTS

The following will be combined with the drawings of the embodiment of the invention to clearly and completely describe the technical scheme of embodiment of the invention, obviously, the described embodiment is only part of the embodiments of the invention, not all of the embodiments. Based on the embodiment in the invention, all other embodiments obtained by ordinary technicians in this field without making creative labor belong to the scope of protection of the invention.

Figure 1:
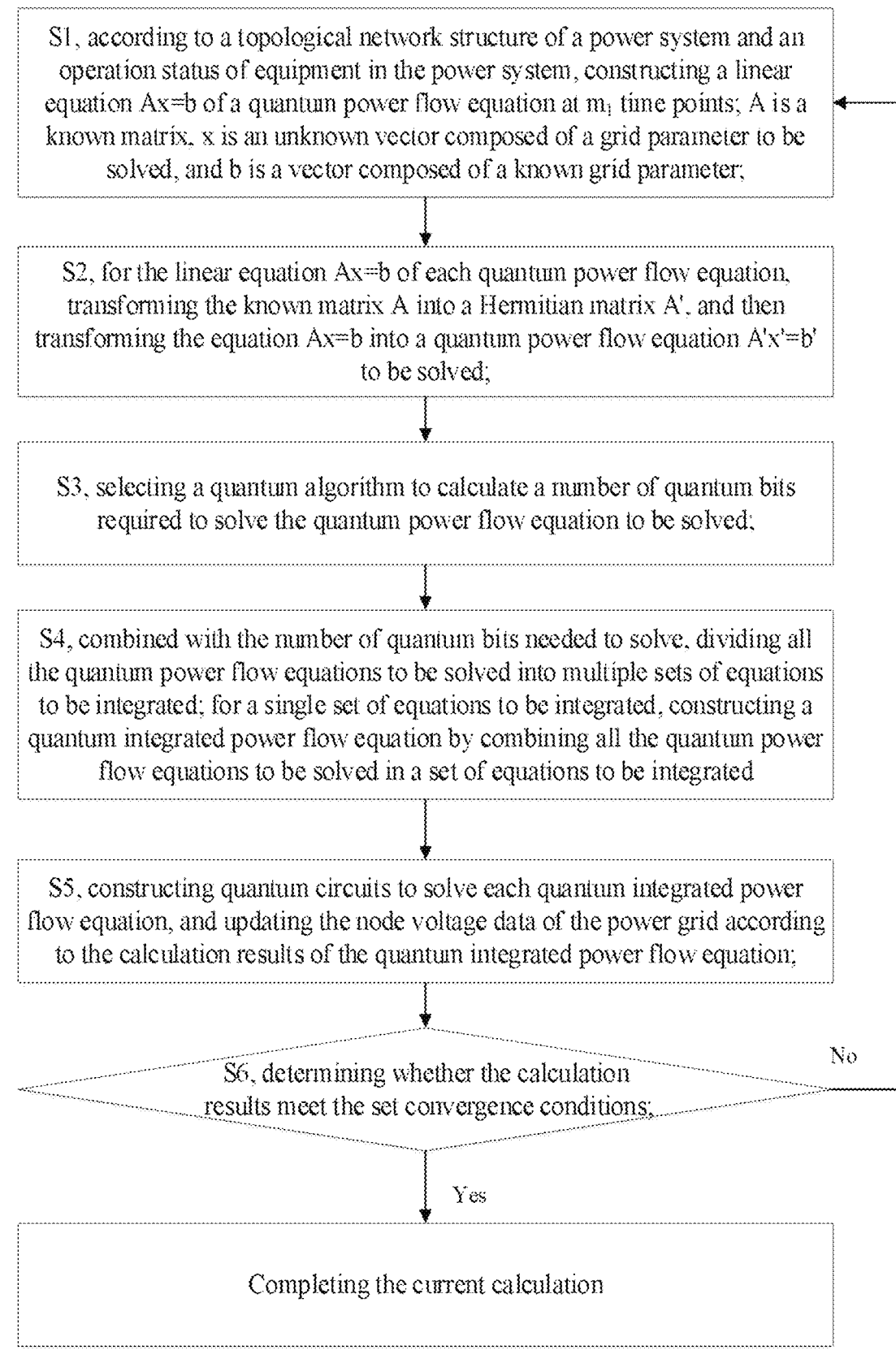
FIG. 1 is a flow chart of the multi-power flow integrated parallel quantum computing method of the power system.

Referring to FIG. 1, the multi-power flow integrated parallel quantum computing method of the power system proposed in this embodiment includes the following steps:

S1, according to the topological network structure of the power system and the operation status of equipment in the power system, the linear equation Ax=b of the quantum power flow equation at $m_1$ time points are constructed; A is a known matrix, x is an unknown vector composed of the grid parameter to be solved, and b is a vector composed of the known grid parameter;

specifically, for different quantum power flow algorithms, because the quantum power flow equations are different, the meanings of A, x, and b are also different, however, ordinary technicians in this field only need to combine the known quantum power flow algorithms to construct the linear equations of the quantum power flow equations of the power grid at each time point.

1. The Quantum Power Flow Equation of the Quantum Direct Current Power Flow Algorithm is $$P = B\delta \quad (1)$$

where P is the column vector of the active power; b is the node susceptance matrix; $\delta$ is the node voltage phase angle column vector; P and B are the known quantities, $\delta$ is the unknown quantity;

it can be seen that when the quantum direct current power flow algorithm is used, A is the node susceptance matrix B of the power grid, b is the column vector of the active power P of the power grid, and x is the column vector of the node voltage phase angle of the power grid.

2. Quantum Alternating Current Power Flow Algorithm

The quantum power flow equation of the quantum alternating current power flow algorithm includes the quantum fast decoupling power flow algorithm, the quantum Newton-Raphson power flow algorithm in rectangular coordinate form, and the quantum Newton-Raphson power flow algorithm in polar coordinate form.

2.1. Quantum Power Flow Equation of Quantum Fast Decoupled Power Flow Algorithm is:

$$\Delta P/V^2 = -B' - \Delta\delta \quad (2)$$

$$\Delta Q/V = -B''\Delta V \quad (3)$$

where $\Delta P$ is the unbalance vector of active power, $\Delta Q$ is the unbalance vector of inactive power; V is the column vector of node voltage amplitude; B' is the susceptance matrix of the unbalanced node of the power grid, and B" is the susceptance matrix of node PQ of the power grid; $\Delta\delta$ is the correction vector of the node voltage phase angle, and $\Delta V$ is the correction vector of the node voltage amplitude; $\Delta P$, $\Delta Q$, V, B' and B" are the known quantities, and $\Delta\delta$ and $\Delta V$ are the unknown quantities.

It can be seen that when the quantum fast decoupling power flow algorithm is used, two linear equations Ax=b can be obtained at each time point; for Formula (2), A is the opposite number of the susceptance matrix of the unbalanced node of the power grid-B', x is the correction vector of the node voltage phase angle of the power grid $\Delta\delta$, b is the unbalanced quantity of the power grid $\Delta P/V^2$;

For Formula (3), A is the opposite number of the susceptance matrix of node PQ of the power grid-B", x is the correction vector $\Delta V$ of the node voltage amplitude of the power grid, and b is the unbalance of the power grid $\Delta Q/V$.

2.2. Quantum Power Flow Equation of Rectangular Coordinate Form Quantum Newton-Raphson Power Flow Algorithm is:

$$\begin{bmatrix} H & N \\ J & L \\ R & S \end{bmatrix} \begin{bmatrix} \Delta e \\ \Delta f \end{bmatrix} = \begin{bmatrix} \Delta P \\ \Delta Q \\ \Delta V^2 \end{bmatrix} \quad (4)$$

where H, N, J, L, R and S are all block matrices of Jacobian matrix; $\Delta e$ is the correction vector of the real part of the node voltage, and $\Delta f$ is the correction vector of the imaginary part of the node voltage; $\Delta P$ is the unbalanced vector of the active power, $\Delta Q$ is the unbalanced vector of the inactive power, and $\Delta V$ is the unbalanced vector of the node voltage amplitude; the block matrix, $\Delta P$, $\Delta Q$ and $\Delta V$ of each Jacobian matrix are the known quantities, and $\Delta e$ and $\Delta f$ are the unknown quantities.

It can be seen that when the quantum Newton-Raphson power flow algorithm in the rectangular coordinate form is adopted, A is the Jacobian matrix composed of H, N, J, L, R, and S, that is, the left matrix of the quantum power flow equation of the quantum Newton-Raphson power flow algorithm in the rectangular coordinate form; x is the correction vector of the nude voltage $[\Delta e, \Delta f]^T$ of the power grid, and the superscript T denotes the matrix transpose; b is the unbalanced column vector $[\Delta P, \Delta Q, \Delta V^2]^T$ of the power grid.

2.3 the Quantum Power Flow Equation of the Polar Coordinate Quantum Newton-Raphson Power Flow Algorithm is:

$$\begin{bmatrix} H & N \\ J & L \end{bmatrix} \begin{bmatrix} \Delta\delta \\ \Delta V/V \end{bmatrix} = \begin{bmatrix} \Delta P \\ \Delta Q \end{bmatrix} \quad (5)$$

where H, N, J, and L are all block matrices of the Jacobian matrix; $\Delta\delta$ is the correction vector of the node voltage phase angle, and $\Delta V$ is the correction vector of the node voltage amplitude. V is the column vector of node voltage amplitude; $\Delta P$ is the unbalanced vector of active power, and $\Delta Q$ is the unbalanced vector of inactive power. The block matrix, $\Delta P$, $\Delta Q$, and V of each Jacobian matrix are known quantities, and $\Delta\delta$ and $\Delta V$ are unknown quantities.

It can be seen that when the quantum Newton-Raphson power flow algorithm in polar coordinate form is adopted, A is the Jacobian matrix composed of H, N, J and L, that is, the left matrix of the quantum power flow equation of the quantum Newton-Raphson power flow algorithm in polar coordinate form; x is the node voltage correction vector $[\Delta\delta, \Delta V/V]^T$ of the power grid, and the superscript T denotes the matrix transpose; b is the unbalanced column vector $[\Delta P, \Delta Q]^T$ of the power grid.

S2, let the linear equation of the $m_1$-th quantum power flow equation be denoted as $A(m_1)x(m_1)=b(m_1)$, $A(m_1)$ is transformed into the Hermitian matrix $A'(m_1)$, and the linear equation $A(m_1)x(m_1)=b(m_1)$ is transformed into the quantum power flow equation $A'(m_1)x'(m_1)=b'(m_1)$, $x'(m_1)$ is the corresponding vector of $x(m_1)$, $b'(m_1)$ is the corresponding vector of $b(m_1)$; $1 \leq m_1 \leq M$, M is the total number of the linear equations of the constructed quantum power flow equation;

it can be seen that for the quantum direct current power flow algorithm, the rectangular coordinate forms the quantum Newton-Raphson power flow algorithm, and the polar coordinate forms the quantum Newton-Raphson power flow algorithm, M=M1; for quantum fast decoupled power flow algorithm, M=2M1.

Specifically, in this step, if $A(m_1)$ is Hermitian matrix, then $A'(m_1)=A(m_1)$, $x'(m_1)=x(m_1)$, $b'(m_1)=b(m_1)$;

if $A(m_1)$ is not a Hermitian matrix, it is necessary to configure $A(m_1)$ into a Hermitian matrix $A'(m_1)$ and transform the linear equation $A(m_1)x(m_1)=b(m_1)$ into $A'(m_1)x'(m_1)=b'(m_1)$; at this time:

$$A'(m_1) = \begin{pmatrix} 0 & A(m_1) \\ A(m_1)^H & 0 \end{pmatrix} \quad (6)$$

$$\begin{bmatrix} 0 & A(m_1) \\ A(m_1)^H & 0 \end{bmatrix} \begin{bmatrix} 0 \\ x(m_1) \end{bmatrix} = \begin{bmatrix} b(m_1) \\ 0 \end{bmatrix} \quad (7)$$

$A(m_1)$ H is the conjugate transpose matrix of $A(m_1)$.

According to Formula (7), $x'(m_1)=[0, x(m_1)]^T$, $b'(m_1)=[b(m_1), 0]^T$.

S3, the quantum algorithm is selected to calculate the number of quantum bits required to solve the quantum power flow equation to be solved;

the number of quantum bits required to solve the quantum power flow equation is determined by the quantum algorithm, the quantum algorithm can choose the variational quantum algorithm or the quantum machine learning algorithm, the HHL algorithm, and so on.

Let $O(m_1)$ denote the order of matrix $A'(m_1)$ and $A(m_1)_k$ denote the eigenvalue of the k-th order of matrix $A'(m_1)$, $1 \leq k \leq O(m_1)$, let $|\lambda(m_1)_k|_{max}=\max\{|\lambda(m_1)_k|, 1 \leq k \leq O(m_1)\}$, $|\lambda(m_1)_k|_{min}=\min\{|\lambda(m_1)_k|, 1 < k \leq O(m_1)\}$, $|\lambda(m_1)_k|$ denotes the absolute value of eigenvalue $\lambda(m_1)_k$, max denotes the maximum value, min denotes the minimum value.

Let the number of quantum bits required for solving $A'(m_1)x'(m_1)=b'(m_1)$ be $n_2(m_1)$, the upper limit of the storage range of $n_2(m_1)$ is $|\lambda(m_1)_k|_{max,2}$, and the lower limit of the storage range of $n_2(m_1)$ is $|\lambda(m_1)_k|_{min,2}$.

Taking the HHL algorithm as an example:

$n_2(m_1)$ is the quantum bit used to store the eigenvalue $|\lambda(m_1)_k|$ of the $A'(m_1)$ in the quantum circuit.

$n_2(m_1)=n_2(m_1,q_1)+n_2(m_1,q_2)+n_2(m_1,q_3)$ $n_2(m_1,q_1)$ is the number of quantum bits used to store the decimal part of $|\lambda(m_1)_k|$, and $n_2(m_1,q_1)$ is determined by the storage accuracy of the set $|\lambda(m_1)_k|$; both $n_2(m_1,q_2)$ and $n_2(m_1,q_3)$ are quantum bits used to store the integer part of $|\lambda(m_1)_k|$.

If $|\lambda(m_1)_k|_{max}>1$, then $n_2(m_1,q_2)$ is the binary digit of the integer part of $|\lambda(m_1)_k|_{max}$; otherwise, $n_2(m_1,q_2)=0$;

if $|\lambda(m_1)_k|_{min}<1$, and $2>2$". $|\lambda(m_1)_k|_{min}>1$, r is any positive integer, then $n_2(m_1,q_3)=r$; otherwise, $n_2(m_1,q_3)=0$.

S4, combined with the number of quantum bits required to solve, all the quantum power flow equations to be solved are divided into multiple sets of equations to be integrated; for a single set of equations to be integrated, the quantum integrated power flow equation is constructed by combining all the quantum power flow equations to be solved in the set of equations to be integrated.

The quantum integrated power flow equation is as follows:

$$\begin{bmatrix} A'(m'_1) & 0 & L & 0 & L & 0 \\ 0 & A'(m'_2) & L & 0 & L & 0 \\ M & M & O & M & L & M \\ 0 & 0 & L & A'(m'_{t2}) & L & 0 \\ M & M & L & M & O & M \\ 0 & 0 & L & 0 & L & A'(m'_{T2}) \end{bmatrix} \begin{bmatrix} x'(m'_1) \\ x'(m'_2) \\ M \\ x'(m'_{t2}) \\ M \\ x'(m'_{T2}) \end{bmatrix} = \begin{bmatrix} b'(m'_1) \\ b'(m'_2) \\ M \\ b'(m'_{t2}) \\ M \\ b'(m'_{T2}) \end{bmatrix} \quad (8)$$

where $A'(m'_1)$ denotes the first quantum power flow equation to be solved in the set of equations to be integrated, $A'(m'_2)$ denotes the second quantum power flow equation to be solved in the set of equations to be integrated, $A'(m'_2)$ denotes the t2-th quantum power flow equation to be solved in the set of equations to be integrated, $A'(m'_{T2})$ denotes the T2-th quantum power flow equation to be solved in the set of equations to be integrated, T2 denotes the number of quantum power flow equations to be solved in the set of equations to be integrated, $1 \leq t2 \leq T2$.

$A'(m'1)x'(m'_1)=b'(m'_1)$ is the $m'_1$-th quantum power flow equation to be solved, $1 \leq m'_1 \leq M$;

$A'(m'_2)x'(m'_2)=b'(m'_2)$ is the $m'_2$-th quantum power flow equation to be solved, $1 \leq m'_2 \leq M$;

$A'(m'_{t2})x'(m'_{t2})=b'(m'_{t2})$ is the $m'_{t2}$-th quantum power flow equation to be solved, $1 \leq m'_2 \leq M$;

$A'(m'_{T2})x'(m'_{T2})=b'(m'_{T2})$ is the $m'_{T2}$-th quantum power flow equation to be solved, $1 \leq m'_{T2} \leq M$.

S5, a quantum circuit to solve each quantum integrated power flow equation is constructed, and the node voltage data of the power grid is updated according to the calculation results of the quantum integrated power flow equation;

specifically, in S5, the quantum algorithm can be directly selected to solve the quantum integrated power flow equation that satisfies the input constraints of the quantum computer;

for the quantum integrated power flow equation that does not meet the input constraints of the quantum computer, it is necessary to first expand the order of the quantum integrated power flow equation to meet the input constraints of the quantum computer, and then select the quantum algorithm for solving it.

The input constraint of the quantum computer is: The order of the equation is $2^{r1}$, and r1 is an arbitrary positive integer.

When the quantum integrated power flow equation, namely Formula (8), does not satisfy the input constraints of the quantum computer, it can be expanded to the following Formula (9), which satisfies the input constraints of the quantum computer.

$$\begin{bmatrix} A'(m'_1) & 0 & L & 0 & L & 0 & 0 \\ 0 & A'(m'_2) & L & 0 & L & 0 & 0 \\ M & M & O & M & L & M & M \\ 0 & 0 & L & A'(m'_{t2}) & L & 0 & 0 \\ M & M & L & M & O & M & M \\ 0 & 0 & L & 0 & L & A'(m'_{T2}) & 0 \\ 0 & 0 & L & 0 & L & 0 & A_e \end{bmatrix} \begin{bmatrix} x'(m'_1) \\ x'(m'_2) \\ M \\ x'(m'_{t2}) \\ M \\ x'(m'_{T2}) \\ x_e \end{bmatrix} = \begin{bmatrix} b'(m'_1) \\ b'(m'_2) \\ M \\ b'(m'_{t2}) \\ M \\ b'(m'_{T2}) \\ b_e \end{bmatrix} \quad (9)$$

where $\Delta e$ is a set expanding order matrix, and $x_e$ and $b_e$ are the set expanding order vectors, the order of magnitude of the vectors in the equation does not change before and after the expanding order of the quantum integrated power flow equation.

When the HHL algorithm is used to solve the quantum integrated power flow equation, when setting the element in $\Delta e$, it should be ensured that the number of quantum bits $n_2(m_1)$ required for the solution of the matrix after the expanding order is consistent with that before the expanding order; that is, the number of quantum bits $n_2(m_1)$ required for the solution of Formula (9) is consistent with the number of quantum bits $n_2(m_1)$ required for the solution of Formula (8).

S6, whether the calculation results meet the set convergence condition is determined; if not, then S1 is returned; if so, the current calculation is completed.

It is worth noting that in the actual implementation, in S5, the quantum computer transmits the calculation results of all quantum integrated power flow equations to the classical computer, and the classical computer updates the node voltage data of the power grid; the classical computer judges whether the calculation result meets the set convergence condition;

when it is not satisfied, the updated equipment operation status in the power system is returned to S1, which is used to update the quantum power flow equation in the classical computer and send it to the quantum computer for the next quantum calculation.

If the calculation result satisfies the convergence condition, the classical computer sends the voltage data of each node in the calculation results to the corresponding node of the power grid for execution.

When implemented, in S4, the number of quantum bits used to solve the quantum power flow equation to be solved can be used as the classification condition of the equation to be integrated. For example, the quantum power flow equation to be solved with the same $n_2(m_1)$ can be migrated to the same set of equations to be integrated.

In this embodiment, a method for dividing the quantum power flow equation to be solved into a set of equations to be integrated is also provided, which is based on the upper limit of storage range $|\lambda(m_1)_k|_{max,2}$ and the lower limit of storage range $|\lambda(m_1)_k|_{min,2}$ corresponding to the number of quantum bits $n_2(m_1)$ required to solve the quantum power flow equation to be solved, including the following steps S41-S43.

S41, the upper limit of storage range $|\lambda(m_1)_k|_{max,2}$ and the lower limit of storage range $|\lambda(m_1)_k|_{min,2}$ are calculated corresponding to the number of partial quantum bits $n_2(m_1)$ required for solving the quantum power flow equation to be solved; the quantum power flow equation to be solved with the maximum ratio of the upper limit of the storage range to the lower limit of the storage range $|\lambda(m_1)_k|_{max,2}/|\lambda(m_1)_k|_{min,2}$ is selected as the benchmark equation; the lower limit of the storage range of the number of quantum bits required to solve the benchmark equation is denoted as $|\lambda|_{min}$, and the upper limit of the storage range of the number of quantum bits required to solve the benchmark equation is denoted as $|\lambda|_{max}$;

Taking the HHL algorithm as an example, the upper limit of storage range $|\lambda(m_1)_k|_{max,2}$ and the lower limit of storage range $|\lambda(m_1)_k|_{min,2}$ corresponding to $n_2(m_1)$ are calculated as follows:

When $|\lambda(m_1)_k|_{max}>1$, the integer part of the upper limit of the storage range $|\lambda(m_1)_k|_{max,2}$ is the maximum decimal number that can be characterized by the $n_2(m_1,q_2)$-bit binary number; otherwise, the integer part of the upper limit of the storage range $|\lambda(m_1)_k|_{max,2}$ is set to 0;

when $|\lambda(m_1)_k|_{min}<1$, the integer part of the lower limit of the storage range $|\lambda(m_1)_k|_{min,2}$ is 0; if $n_2(m_1,q_1)=0$, then the decimal part of the upper limit of the storage range $|\lambda(m_1)_k|_{max,2}$ is the difference of the reciprocal $1-1/[2^{n_2(m_1,q_3)}]$ of the power of $n_2(m_1,q_3)$ of 2, the decimal part of the lower limit of the storage range $|\lambda(m_1)_k|_{min,2}$ is the difference of the reciprocal $2-2/[2^{n_2(m_1,q_3)}]$ of the power of $n_2(m_1,q_3)$ of 2; if $n_2(m_1,q_1)\neq 0$, then the decimal part of the upper limit of the storage range $|\lambda(m_1)_k|_{max,2}$ is the difference of the reciprocal when the decimal part of the upper limit of the storage range $|\lambda(m_1)_k|_{max,2}$ is the power of $n_2(m_1,q_1)+n_2(m_1,q_3)$ of 2, the decimal part of the lower limit of storage range $|\lambda(m_1)_k|_{min,2}$ is the reciprocal of the power of $n_2(m_1,q_1)+n_2(m_1,q_3)$ of 2;

when $|\lambda(m_1)_k|_{min}<1$, the integer part of the lower limit of the storage range $|\lambda(m_1)_k|_{min,2}$ is 1; if $n_2(m_1,q_1)=0$, then the decimal part of the upper limit of the storage range $|\lambda(m_1)_k|_{max,2}$ is set to 0, the decimal part of the lower limit of the storage range $|\lambda(m_1)_k|_{min,2}$ is set to 0; if $n_2(m_1,q_1)\neq 0$, then the decimal part of the upper limit of the storage range $|\lambda(m_1)_k|_{max,2}$ is the difference of the reciprocal of the power of $n_2(m_1,q_1)+n_2(m_1,q_3)$ of 2, the decimal part of the lower limit of storage range $|\lambda(m_1)_k|_{min,2}$ is the reciprocal of the power of $n_2(m_1,q_1)+n_2(m_1,q_3)$ of 2.

That is, when $|\lambda(m_1)_k|_{max}>1$:

The integer part of $|\lambda(m_1)_k|_{max,2}=2^{\wedge}0+2^{\wedge}1+\ldots+2^{\wedge}i+\ldots+2^{\wedge}n_2(m_1,q_2)$ $2^{\wedge}i$ denotes the i-th power of 2, $0\leq i\leq n_2(m_1,q_2)$.

When $|\lambda(m_1)_k|_{max}<1$:

The integer part of $|\lambda(m_1)_k|_{max,2}=0$;

when $|\lambda(m_1)_k|_{min}<1$ and $n_2(m_1,q_1)=0$:

The decimal part of $|\lambda(m_1)_k|_{min,2}=1/[2^{\wedge}n_2(m_1,q_3)]$

The decimal part of $|\lambda(m_1)_k|_{max,2}=[2^{\wedge}0+2^{\wedge}1+\ldots+2^{\wedge}j+\ldots+2^{\wedge}[n_2(m_1,q_3)-1]]/[2^{\wedge}n_2(m_1,q_3)]$ $=1-1/[2^{\wedge}n_2(m_1,q_3)]$ The integer part of $|\lambda(m_1)_k|_{min,2}=0$ $2^{\wedge}j$ denotes the j-th power of 2, $0\leq j\leq n_2(m_1,q_3)-1$;

when $|\lambda(m_1)_k|_{min}<1$ and $n_2(m_1,q_1)\neq 0$:

The decimal part of $|\lambda(m_1)_k|_{min,2}=1/[2^{\wedge}[n_2(m_1,q_1)+n_2(m_1,q_3)]]$ The decimal part of $|\lambda(m_1)_k|_{max,2}=1-1/[2^{\wedge}[n_2(m_1,q_1)+n_2(m_1,q_3)]]$ The integer part of $|\lambda(m_1)_k|_{min,2}=0$;

when $|\lambda(m_1)_k|_{min}>1$ and $n_2(m_1,q_1)=0$:

The decimal part of $|\lambda(m_1)_k|_{max,2}=0$

The decimal part of $|\lambda(m_1)_k|_{min,2}=0$

The integer part of $|\lambda(m_1)_k|_{min,2}=1$

When $|\lambda(m_1)_k|_{min}>1$ and $n_2(m_1,q_1)\neq 0$:

The decimal part of $|\lambda(m_1)_k|_{min,2}=1/[2^{\wedge}[n_2(m_1,q_1)+n_2(m_1,q_3)]]$ The decimal part of $|\lambda(m_1)_k|_{max,2}=1-1/[2^{\wedge}[n_2(m_1,q_1)+n_2(m_1,q_3)]]$ The integer part of $|\lambda(m_1)_k|_{min,2}=1$ S42, the set of equations to be integrated is constructed, and the quantum power flow equations to be solved that satisfy the screening conditions $|\lambda(m_{t2})_k|_{max}\leq|\lambda|_{max}$ and $|\lambda(m_{t2})_k|_{min}\geq|\lambda|$ min in the set of quantum power flow equations to be solved are migrated to the set of equations to be integrated; $|\lambda(m_{t2})_k|_{max}$ denotes the maximum value of the absolute value of the eigenvalues of the $m_{t2}$-th quantum power flow equation to be solved in the set of quantum power flow equations to be solved, and $|\lambda(m_{t2})_k|_{min}$ denotes the minimum value of the absolute value of the eigenvalues of the $m_{t2}$-th quantum power flow equation to be solved in the set of quantum power flow equations to be solved;

S43, S41-S2 are cycled until clearing the set of quantum power flow equations to be solved; then, the quantum integrated power flow equation to be solved corresponding to the set of equations to be integrated is constructed.

The following combines the specific embodiments to verify the above-mentioned multi-power flow integrated parallel quantum computing method of the power system.

In this embodiment, taking the power system operation data at one-time point of the IEEE-3 node system as an example, the quantum fast decoupled power flow algorithm is used to generate the quantum power flow equation Ax=b to be solved, the quantum power flow equation Ax=b is solved by the multi-power flow integrated parallel quantum computing method of power system proposed by the invention, and the HHL algorithm is used to solve the quantum integrated power flow equation to verify the effectiveness of the proposed multi-power flow integrated parallel quantum computing method of power system.

In this embodiment, the convergence accuracy of quantum power flow calculation is set to $10^{-6}$.

Figure 2:
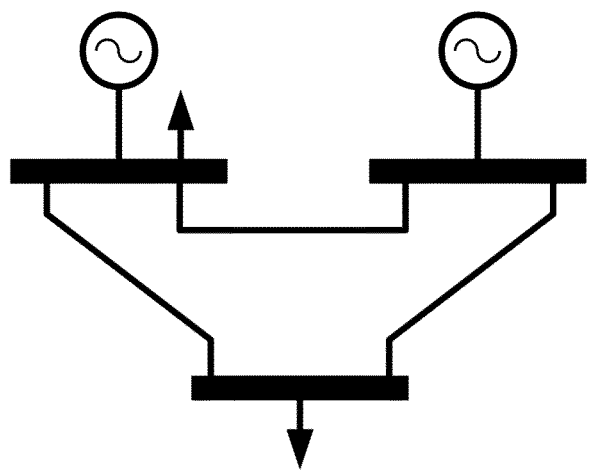
FIG. 2 is a network topology of the IEEE-3 node system.

The network topology of the IEEE-3 node system is shown in FIG. 2, including one balanced node and two PQ nodes, so the matrix-b' of the formula and the matrix-B" of the formula are exactly the same, both of them are Hermitian matrices with an order of 2. There is no need to perform the preprocessing operations of Formula (6) and Formula (7), and the matrix parameters of −b' and −B" are also consistent. According to the principle of quantum fast decoupled power flow calculation, −b' and −B" will not change with iterative calculation.

According to the proposed multi-power flow integrated parallel quantum computing method of power system, Formula (2) or Formula (3) can be used as the benchmark integrated equation, and the other equation needs to be included in the set of quantum power flow equations to be integrated; then, according to the structure shown in Formula (8), Formula (2) and Formula (3) are integrated into the quantum integrated power flow equation to be solved, as shown in Formula (10). Since the order of Formula (10) is 4, there is no need to perform the degree elevation operation of Formula (9), and the quantum circuit can be constructed directly in the quantum computer according to the principle of the HHL algorithm to complete the solution.

$$\begin{bmatrix} -B'' & 0 \\ 0 & -B'' \end{bmatrix} \begin{bmatrix} \Delta\delta \\ \Delta V \end{bmatrix} = \begin{bmatrix} \Delta P/V^2 \\ \Delta Q/V \end{bmatrix} \quad (10)$$

The calculation results and errors of the traditional fast decoupled power flow algorithm of the IEEE-3 node system and the proposed multi-power flow integrated parallel quantum computing method of the power system are shown in Table 1. The calculation error indicates that each error is 0, which confirms the effectiveness of the proposed multi-power flow integrated parallel quantum computing method of the power system.

TABLE 1

Power flow calculation results of IEEE-3 bus system

| | Voltage amplitude | | Voltage phase-angle | |
|---|---|---|---|---|
| | Node 1 | Node 2 | Node 1 | Node 2 |
| Traditional fast decoupled power flow calculation | 1.06 | 0.98 | 0.17 | −0.12 |
| Method in this invention | 1.06 | 0.98 | 0.17 | −0.12 |
| Calculation error | 0 | 0 | 0 | 0 |

In addition, compared with the classical quantum fast decoupled power flow algorithm based on the HHL algorithm, the proposed multi-power flow integrated parallel quantum computing method of the power system can reduce the number of quantum bits by 46% and the number of quantum gates by 49%.

Of course, for technicians in this field, the invention is not limited to the details of the above exemplary embodiments, but also includes the same or similar structures that can be realized in other specific forms without deviating from the spirit or basic characteristics of the invention. Therefore, no matter from which point of view, the embodiment should be regarded as exemplary and non-restrictive, the scope of the invention is limited by the attached claim rather than the above description, so it aims to include all changes within the meaning and scope of the equivalent elements of the claim in the invention. Any accompanying mark in the claims should not be regarded as a claim involved in the restriction.

In addition, it should be understood that although this instruction is described according to the embodiment, not every embodiment only contains a separate technical scheme, this description of the instruction is only for the sake of clarity, the technical personnel in this field should take the instruction as a whole, and the technical schemes in each embodiment can also be appropriately combined to form other embodiments that can be understood by the technical personnel in this field.

The technology, shape, and structure parts not described in detail in the invention are all known technologies.

What is claimed is:

1. A multi-power flow integrated parallel quantum computing method of a power system, comprising the following steps:

S1, according to a topological network structure of the power system and an operation status of equipment in the power system, constructing a linear equation Ax=b of a quantum power flow equation at $m_1$ time points; A is a known matrix, x is an unknown vector composed of a grid parameter to be solved, and b is a vector composed of a known grid parameter;

S2, for the linear equation Ax=b of each quantum power flow equation, transforming the known matrix A into a Hermitian matrix A', and then transforming the equation Ax=b into a quantum power flow equation A'x'=b' to be solved;

S3, selecting a quantum algorithm to calculate a number of quantum bits required to solve the quantum power flow equation to be solved;

S4, combined with the number of quantum bits needed to solve, dividing all the quantum power flow equations to be solved into multiple sets of equations to be integrated; for a single set of equations to be integrated, constructing a quantum integrated power flow equation by combining all the quantum power flow equations to be solved in a set of equations to be integrated;

S5, constructing a quantum circuit to solve each quantum integrated power flow equation to obtain a calculation result of the quantum integrated power flow equation; and S6, determining whether the calculation result meets a set convergence condition; if the calculation result does not meet the set convergence condition, then returning to S1; if the calculation result meets the set convergence condition, updating node voltage of a power grid of the power system according to the calculation result, thereby completing adjustment of the node voltage of the power grid of the power system to realize safe and economic operation of the power system;

wherein dividing the quantum power flow equations to be solved into multiple sets of equations to be integrated in S4 comprises the following steps:

S41, calculating an upper limit of a storage range and a lower limit of the storage range corresponding to the number of quantum bits required to solve the quantum power flow equation to be solved; selecting the quantum power flow equation to be solved with a largest ratio of the upper limit of the storage range to the lower limit of the storage range as a benchmark equation; the lower limit of the storage range of the number of quantum bits required to solve the benchmark equation is denoted as $|\lambda|_{min}$, and the upper limit of the storage range of the number of quantum bits required to solve the benchmark equation is denoted as $|\lambda|_{max}$;

S42, constructing the set of equations to be integrated, and migrating the quantum power flow equation to be solved that satisfies screening conditions of $|\lambda(m_{t2})_k|_{max} \leq |\lambda|_{max}$ and $|\lambda(m_{t2})_k|_{min} \geq |\lambda|_{min}$ in the set of quantum power flow equations to be solved to the set of equations to be integrated; $|\lambda(m_{t2})_k|_{max}$ denotes a maximum value of an absolute value of an eigenvalue of a $m_{t2}$-th quantum power flow equation to be solved in the set of quantum power flow equations to be solved, and $|\lambda(m_{t2})_k|_{min}$ denotes a minimum value of the absolute value of the eigenvalue of the $m_{t2}$-th quantum power flow equation to be solved in the set of quantum power flow equations to be solved; $\lambda(m_{t2})_k$ denotes a k-th eigenvalue of the $m_{t2}$-th quantum power flow equation to be solved in the set of quantum power flow equations to be solved; and S43, determining whether the set of quantum power flow equations to be solved is cleared; if not, then returning S41; if so, constructing the quantum integrated power flow equation corresponding to the set of equations to be integrated.

2. The multi-power flow integrated parallel quantum computing method of the power system according to claim 1, wherein assuming a total number of linear equations $Ax=b$ of the quantum power flow equation constructed in S1 is M, a $m_1$-th equation is $A(m_1)x(m_1)=b(m_1)$, and a transformed quantum power flow equation to be solved is $A'(m_1)x'(m_1)=b'(m_1)$;

$$A'(m_1) = \begin{pmatrix} 0 & A(m_1) \\ A(m_1)^H & 0 \end{pmatrix}$$

$$x'(m_1) = [0, x(m_1)]^T$$

$$b'(m_1) = [b(m_1), 0]^T$$

wherein $A(m_1)$ is a known matrix in the $m_1$-th equation, $x(m_1)$ is an unknown vector composed of grid parameters to be solved in the $m_1$-th equation, $b(m_1)$ is a vector composed of the known grid parameter in the $m_1$-th equation, $x'(m_1)$ is a corresponding vector of $x(m_1)$, $b'(m_1)$ is a corresponding vector of $b(m_1)$, $A'(m_1)$ is a Hermitian matrix transmitted by $A(m_1)$, and superscript T denotes a transpose.

3. The multi-power flow integrated parallel quantum computing method of the power system according to claim 2, wherein assuming $n_2(m_1)$ denotes the number of quantum bits required to solve an $m_{t2}$-th quantum power flow equation to be solved, the upper limit of the storage range $|\lambda(m_1)_k|_{max,2}$ and the lower limit of the storage range $|\lambda(m_1)_k|_{min,2}$ corresponding to $n_2(m_1)$ are calculated as follows:

when $|\lambda(m_1)_k|_{max} > 1$: an integer part of $|\lambda(m_1)_k|_{max,2} = 2^0 + 2^1 + \ldots + 2^i + \ldots + 2^{n_2(m_1,q_2)}$, $2^i$ denotes an i-th power of 2, $0 \leq i \leq n_2(m_1,q_2)$;

when $|\lambda(m_1)_k|_{max} < 1$: the integer part of $|\lambda(m_1)_k|_{max,2} = 0$;

when $|\lambda(m_1)_k|_{min} < 1$ and $n_2(m_1,q_1) = 0$: a decimal part of $|\lambda(m_1)_k|_{min,2} = 1/[2^{n_2(m_1,q_3)}]$, a decimal part of $|\lambda(m_1)_k|_{max,2} = 1 - 1/[2^{n_2(m_1,q_3)}]$, and an integer part of $|\lambda(m_1)_k|_{min,2} = 0$;

when $|\lambda(m_1)_k|_{min} < 1$ and $n_2(m_1,q_1) \neq 0$: the decimal part of $|\lambda(m_1)_k|_{min,2} = 1/[2^{[n_2(m_1,q_1)+n_2(m_1,q_3)]}]$, the decimal part of $|\lambda(m_1)_k|_{max,2} = 1 - 1/[2^{[n_2(m_1,q_1)+n_2(m_1,q_3)]}]$, and the integer part of $|\lambda(m_1)_k|_{min,2} = 0$;

when $|\lambda(m_1)_k|_{min} > 1$ and $n_2(m_1,q_1) = 0$: the decimal part of $|\lambda(m_1)_k|_{max,2} = 0$, the decimal part of $|\lambda(m_1)_k|_{min,2} = 0$, and the integer part of $|\lambda(m_1)_k|_{min,2} = 1$; and when $|\lambda(m_1)_k|_{min} > 1$ and $n_2(m_1,q_1) \neq 0$: the decimal part of $|\lambda(m_1)_k|_{min,2} = 1/[2^{[n_2(m_1, q_1)+n_2(m_1,q_3)]}]$, the decimal part of $|\lambda(m_1)_k|_{max,2} = 1 - 1/[2^{[n_2(m_1,q_1)+n_2(m_1,q_3)]}]$, and the integer part of $|\lambda(m_1)_k|_{min,2} = 1$;

wherein $n_2(m_1,q_1)$ is a number of quantum bits used to store a decimal part of the eigenvalue of the quantum power flow equation to be solved, and $n_2(m_1,q_2)$ and $n_2(m_1,q_3)$ are numbers of quantum bits used to store an integer part of the eigenvalue of the quantum power flow equation to be solved.

4. The multi-power flow integrated parallel quantum computing method of the power system according to claim 3, wherein if $|\lambda(m_1)_k|_{max,2} > 1$, then $n_2(m_1,q_2)$ is a binary digit of the integer part of $|\lambda(m_1)_k|_{max}$; otherwise, $n_2(m_1,q_2) = 0$; and if $|\lambda(m_1)_k|_{min} < 1$, and $2 > 2^r \cdot |\lambda(m_1)_k|_{min} > 1$, r is any positive integer, then $n_2(m_1,q_3) = r$; otherwise, $n_2(m_1,q_3) = 0$.

5. The multi-power flow integrated parallel quantum computing method of the power system according to claim 2, wherein in S4, the quantum power flow equation to be solved belongs to the set of equations to be integrated of $n_2(m_1)$ when the quantum power flow equation to be solved is same with $n_2(m_1)$.

6. The multi-power flow integrated parallel quantum computing method of the power system according to claim 1, wherein in S5, when the quantum integrated power flow equation satisfies an input constraint of a quantum computer, the quantum algorithm is selected to solve the quantum integrated power flow equation; on the contrary, an expanding order for the quantum integrated power flow equation is performed to meet the input constraint of the quantum computer, and then the quantum algorithm is selected to solve the quantum integrated power flow equation after expanding order; and an order of magnitude of a vector in the quantum integrated power flow equation does not change before and after expanding order of the quantum integrated power flow equation.

7. The multi-power flow integrated parallel quantum computing method of the power system according to claim 1, wherein in S1, a construction method of the linear equation of the quantum power flow equation adopts: quantum direct current power flow algorithm, quantum fast decoupling power flow algorithm, rectangular coordinate form quantum Newton-Raphson power flow algorithm or polar coordinate form quantum Newton-Raphson power flow algorithm.

8. A multi-power flow integrated parallel quantum computing system, comprising a memory and a processor, wherein a computer program is stored in the memory, the processor is connected to the memory, and the processor is used to execute the computer program to realize the multi-power flow integrated parallel quantum computing method of the power system according to claim 1.

9. A storage medium, wherein the storage medium stores a computer program, and the computer program is configured to be executed to realize the multi-power flow integrated parallel quantum computing method of the power system according to claim 1.

10. The multi-power flow integrated parallel quantum computing system according to claim 8, wherein in the multi-power flow integrated parallel quantum computing method of the power system, assuming a total number of linear equations Ax=b of the quantum power flow equation constructed in S1 is M, a $m_1$-th equation is $A(m_1)x(m_1)=b(m_1)$, and a transformed quantum power flow equation to be solved is $A'(m_1)x'(m_1)=b'(m_1)$;

$$A'(m_1) = \begin{pmatrix} 0 & A(m_1) \\ A(m_1)^H & 0 \end{pmatrix}$$

$$x'(m_1) = [0, x(m_1)]^T$$

$$b'(m_1) = [b(m_1), 0]^T$$

wherein $A(m_1)$ is a known matrix in the $m_1$-th equation, $x(m_1)$ is an unknown vector composed of grid parameters to be solved in the $m_1$-th equation, $b(m_1)$ is a vector composed of the known grid parameter in the $m_1$-th equation, $x'(m_1)$ is a corresponding vector of $x(m_1)$, $b'(m_1)$ is a corresponding vector of $b(m_1)$, $A'(m_1)$ is a Hermitian matrix transmitted by $A(m_1)$, and superscript T denotes a transpose.

11. The multi-power flow integrated parallel quantum computing system according to claim 10, wherein in the multi-power flow integrated parallel quantum computing method of the power system, assuming $n_2(m_1)$ denotes the number of quantum bits required to solve an $m_{t2}$-th quantum power flow equation to be solved, the upper limit of the storage range $|\lambda(m_1)_k|_{max,2}$ and the lower limit of the storage range $|\lambda(m_1)_k|_{min,2}$ corresponding to $n_2(m_1)$ are calculated as follows:

when $|\lambda(m_1)_k|_{max}>1$: an integer part of $|\lambda(m_1)_k|_{max,2}=2^0+2^1+\ldots+2^i+\ldots+2^{n_2(m_1,q_2)}$, $2^i$ denotes an i-th power of 2, $0 \le i \le n_2(m_1,q_2)$;

when $|\lambda(m_1)_k|_{max}<1$: the integer part of $|\lambda(m_1)_k|_{max,2}=0$;

when $|\lambda(m_1)_k|_{min}<1$ and $n_2(m_1,q_1)=0$: a decimal part of $|\lambda(m_1)_k|_{min,2}=1/[2^{n_2(m_1,q_3)}]$, a decimal part of $|\lambda(m_1)_k|_{max,2}=1-1/[2^{n_2(m_1,q_3)}]$, and an integer part of $|\lambda(m_1)_k|_{min,2}=0$;

when $|\lambda(m_1)_k|_{min}<1$ and $n_2(m_1,q_1)\ne 0$: the decimal part of $|\lambda(m_1)_k|_{min,2}=1/[2^{[n_2(m_1,q_1)+n_2(m_1,q_3)]}]$, the decimal part of $|\lambda(m_1)_k|_{max,2}=1-1/[2^{[n_2(m_1,q_1)+n_2(m_1,q_3)]}]$, and the integer part of $|\lambda(m_1)_k|_{min,2}=0$;

when $|\lambda(m_1)_k|_{min}>1$ and $n_2(m_1,q_1)=0$: the decimal part of $|\lambda(m_1)_k|_{max,2}=0$, the decimal part of $(m_1)_k|_{min,2}=0$, and the integer part of $|\lambda(m_1)_k|_{min,2}=1$; and when $|\lambda(m_1)_k|_{min}>1$ and $n_2(m_1,q_1)\ne 0$: the decimal part of $|\lambda(m_1)_k|_{min,2}=1/[2^{[n_2(m_1,q_1)+n_2(m_1,q_3)]}]$, the decimal part of $|\lambda(m_1)_k|_{max,2}=1-1/[2^{[n_2(m_1,q_1)+n_2(m_1,q_3)]}]$, and the integer part of $|\lambda(m_1)_k|_{min,2}=1$;

wherein $n_2(m_1,q_1)$ is a number of quantum bits used to store a decimal part of the eigenvalue of the quantum power flow equation to be solved, and $n_2(m_1,q_2)$ and $n_2(m_1,q_3)$ are numbers of quantum bits used to store an integer part of the eigenvalue of the quantum power flow equation to be solved.

12. The multi-power flow integrated parallel quantum computing system according to claim 11, wherein if $(\backslash(m_1)_k|_{max}>1$, then $n_2(m_1,q_2)$ is a binary digit of the integer part of $|\lambda(m_1)_k|_{max}$; otherwise, $n_2(m_1,q_2)=0$; and if $|\lambda(m_1)_k|_{min}<1$, and $2>2^r\cdot|\lambda(m_1)_k|_{min}>1$, r is any positive integer, then $n_2(m_1,q_3)=r$; otherwise, $n_2(m_1,q_3)=0$.

13. The multi-power flow integrated parallel quantum computing system according to claim 10, wherein in S4 of the multi-power flow integrated parallel quantum computing method of the power system, the quantum power flow equation to be solved belongs to the set of equations to be integrated of $n_2(m_1)$ when the quantum power flow equation to be solved is same with $n_2(m_1)$.

14. The multi-power flow integrated parallel quantum computing system according to claim 8, wherein in S5 of the multi-power flow integrated parallel quantum computing method of the power system, when the quantum integrated power flow equation satisfies an input constraint of a quantum computer, the quantum algorithm is selected to solve the quantum integrated power flow equation; on the contrary, an expanding order for the quantum integrated power flow equation is performed to meet the input constraint of the quantum computer, and then the quantum algorithm is selected to solve the quantum integrated power flow equation after expanding order; and an order of magnitude of a vector in the quantum integrated power flow equation does not change before and after expanding order of the quantum integrated power flow equation.

15. The multi-power flow integrated parallel quantum computing system according to claim 8, wherein in S1 of the multi-power flow integrated parallel quantum computing method of the power system, a construction method of the linear equation of the quantum power flow equation adopts: quantum direct current power flow algorithm, quantum fast decoupling power flow algorithm, rectangular coordinate form quantum Newton-Raphson power flow algorithm or polar coordinate form quantum Newton-Raphson power flow algorithm.

16. The storage medium according to claim 9, wherein in the multi-power flow integrated parallel quantum computing method of the power system, assuming a total number of linear equations Ax=b of the quantum power flow equation constructed in S1 is M, a $m_1$-th equation is $A(m_1)x(m_1)=b(m_1)$, and a transformed quantum power flow equation to be solved is $A'(m_1)x'(m_1)=b'(m_1)$;

$$A'(m_1) = \begin{pmatrix} 0 & A(m_1) \\ A(m_1)^H & 0 \end{pmatrix}$$

$$x'(m_1) = [0, x(m_1)]^T$$

$$b'(m_1) = [b(m_1), 0]^T$$

wherein $A(m_1)$ is a known matrix in the $m_1$-th equation, $x(m_1)$ is an unknown vector composed of grid parameters to be solved in the $m_1$-th equation, $b(m_1)$ is a vector composed of the known grid parameter in the $m_1$-th equation, $x'(m_1)$ is a corresponding vector of $x(m_1)$, $b'(m_1)$ is a corresponding vector of $b(m_1)$, $A'(m_1)$ is a Hermitian matrix transmitted by $A(m_1)$, and superscript T denotes a transpose.

17. The storage medium according to claim 16, wherein in the multi-power flow integrated parallel quantum computing method of the power system, assuming $n_2(m_1)$ denotes the number of quantum bits required to solve an $m_{t2}$-th quantum power flow equation to be solved, the upper limit of the storage range $|\lambda(m_1)_k|_{max,2}$ and the lower limit of the storage range $|\lambda(m_1)_k|_{min,2}$ corresponding to $n_2(m_1)$ are calculated as follows:

when $|\lambda(m_1)_k|_{max}>1$: an integer part of $|\lambda(m_1)_k|_{max,2}=2^0+2^1+\ldots+2^i+\ldots+2^{n_2(m_1,q_2)}$, $2^i$ denotes an i-th power of 2, $0 \leq i \leq n_2(m_1,q_2)$;

when $|\lambda(m_1)_k|_{max}<1$: the integer part of $|\lambda(m_1)_k|_{max,2}=0$;

when $|\lambda(m_1)_k|_{min}<1$ and $n_2(m_1,q_1)=0$: a decimal part of $|\lambda(m_1)_k|_{min,2}=1/[2^{n_2(m_1,q_3)}]$, a decimal part of $|\lambda(m_1)_k|_{max,2}=1-1/[2^{n_2(m_1,q_3)}]$, and an integer part of $|\lambda(m_1)_k|_{min,2}=0$;

when $|\lambda(m_1)_k|_{min}<1$ and $n_2(m_1,q_1)\neq 0$: the decimal part of $|\lambda(m_1)_k|_{min,2}=1/[2^{[n_2(m_1,q_1)+n_2(m_1,q_3)]}]$, the decimal part of $|\lambda(m_1)_k|_{max,2}=1-1/[2^{[n_2(m_1,q_1)+n_2(m_1,q_3)]}]$, and the integer part of $|\lambda(m_1)_k|_{min,2}=0$;

when $|\lambda(m_1)_k|_{min}>1$ and $n_2(m_1,q_1)=0$: the decimal part of $|\lambda(m_1)_k|_{max,2}=0$, the decimal part of $|\lambda(m_1)_k|_{min,2}=0$, and the integer part of $|\lambda(m_1)_k|_{min,2}=1$; and when $|\lambda(m_1)_k|_{min}>1$ and $n_2(m_1,q_1)\neq 0$: the decimal part of $|\lambda(m_1)_k|_{min,2}=1/[2^{[n_2(m_1,q_1)+n_2(m_1,q_3)]}]$, the decimal part of $|\lambda(m_1)_k|_{max,2}=1-1/[2^{[n_2(m_1,q_1)+n_2(m_1,q_3)]}]$, and the integer part of $|\lambda(m_1)_k|_{min,2}=1$;

wherein $n_2(m_1,q_1)$ is a number of quantum bits used to store a decimal part of the eigenvalue of the quantum power flow equation to be solved, and $n_2(m_1,q_2)$ and $n_2(m_1,q_3)$ are numbers of quantum bits used to store an integer part of the eigenvalue of the quantum power flow equation to be solved.

18. The storage medium according to claim 17, wherein if $|\lambda(m_1)_k|_{max\_1}$, then $n_2(m_1,q_2)$ is a binary digit of the integer part of $|\lambda(m_1)_k|_{max}$; otherwise, $n_2(m_1,q_2)=0$; and if $|\lambda(m_1)_k|_{min}<1$, and $2>2^r \cdot |\lambda(m_1)_k|_{min\_1}$, r is any positive integer, then $n_2(m_1,q_3)=r$; otherwise, $n_2(m_1,q_3)=0$.

19. The storage medium according to claim 16, wherein in S4 of the multi-power flow integrated parallel quantum computing method of the power system, the quantum power flow equation to be solved belongs to the set of equations to be integrated of $n_2(m_1)$ when the quantum power flow equation to be solved is same with $n_2(m_1)$.

20. The storage medium according to claim 9, wherein in S5 of the multi-power flow integrated parallel quantum computing method of the power system, when the quantum integrated power flow equation satisfies an input constraint of a quantum computer, the quantum algorithm is selected to solve the quantum integrated power flow equation; on the contrary, an expanding order for the quantum integrated power flow equation is performed to meet the input constraint of the quantum computer, and then the quantum algorithm is selected to solve the quantum integrated power flow equation after expanding order; and an order of magnitude of a vector in the quantum integrated power flow equation does not change before and after expanding order of the quantum integrated power flow equation.

* * * * *